(12) United States Patent
Wei

(10) Patent No.: US 8,731,599 B2
(45) Date of Patent: May 20, 2014

(54) METHOD AND DEVICE FOR PAIRING USER TERMINALS IN MULTIUSER-MULTIPLE INPUT MULTIPLE OUTPUT

(75) Inventor: Wei Wei, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 199 days.

(21) Appl. No.: 13/215,684

(22) Filed: Aug. 23, 2011

(65) Prior Publication Data

US 2011/0306384 A1    Dec. 15, 2011

Related U.S. Application Data

(63) Continuation of application No. PCT/CN2009/073737, filed on Sep. 3, 2009.

(30) Foreign Application Priority Data

Apr. 15, 2009    (CN) .......................... 2009 1 0082170

(51) Int. Cl.
*H04B 7/00*    (2006.01)
*H04B 17/00*    (2006.01)
*H04B 1/00*    (2006.01)

(52) U.S. Cl.
USPC ........................... 455/522; 455/67.11; 455/69

(58) Field of Classification Search
USPC ........................................................ 455/522
See application file for complete search history.

(56) References Cited

U.S. PATENT DOCUMENTS

| 2008/0188260 | A1* | 8/2008 | Xiao et al. | 455/522 |
| 2009/0069057 | A1* | 3/2009 | Haartsen et al. | 455/574 |
| 2009/0196203 | A1* | 8/2009 | Taira et al. | 370/280 |

FOREIGN PATENT DOCUMENTS

| CN | 1937849 A | 3/2007 | H04Q 7/38 |
| CN | 101192865 A | 6/2008 | H04B 7/04 |
| CN | 101222267 A | 7/2008 | H04B 7/26 |
| CN | 101557251 A | 10/2009 | H04B 7/04 |
| WO | WO 2009/012615 A1 | 1/2009 | H04B 7/26 |

OTHER PUBLICATIONS

"Best Companion" Reporting for Improved Single-Cell MU-MIMO Pairing, 3GPP TSG RAN WG1 #56bis Meeting, Mar. 23-27, 2009, pp. 1-5.

* cited by examiner

*Primary Examiner* — Ping Hsieh
*Assistant Examiner* — Xin Jia

(57) ABSTRACT

A method for pairing user terminals in the MU-MIMO system comprises: a base station sets pairing parameters; the base station receives report information of a user terminal, and sets parameter identifiers according to the set pairing parameters and the report information; and after determining that the user terminal which reported the report information is a user terminal to be paired, the base station determines a user terminal paired with the user terminal to be paired according to the set parameter identifiers. A device for pairing user terminals in the MU-MIMO system comprises a parameter setting unit, a parameter identifier setting unit and a pairing performing unit. Under the precondition of considering the path loss condition of the user terminals, the present invention combines with the path condition of the user terminals to pair the user terminals, which can relieve the influences of the interference on the pairing result to a certain extent, and improve the performance of the MU-MIMO system.

9 Claims, 3 Drawing Sheets

METHOD AND DEVICE FOR PAIRING USER TERMINALS IN MULTIUSER-MULTIPLE INPUT MULTIPLE OUTPUT

This is a continuation of International Application PCT/CN2009/073737, with an International Filing Date of Sep. 3, 2009, which claims priority to Chinese Application No. 200910082170.8, filed Apr. 15, 2009, each of which is incorporated by reference.

FIELD OF THE INVENTION

The present invention relates to a Multiuser-Multiple input Multiple output (MU-MIMO for short) technology in wireless communication networks, and in particular, to a method and a device for pairing user terminals in the MU-MIMO.

BACKGROUND OF THE INVENTION

In broadband wireless communication networks of the next generation, especially in relay networks with a relay station (RS for short), solving the problem of inter-cell interference in the wireless communication networks has become a key factor to improve a user terminal (UT) throughput and an average user terminal throughput in a cell.

Currently, the methods such as interference randomization, interference coordination and interference elimination and etc. are put forward in projects of the Institute for Electrical and Electronic Engineers (IEEE for short) 802.16j of the U.S.A., of the International Mobile Telecommunication Advance (IMT-Advanced for short) and of the WINNER (Wireless World Initiative New Radio), to solve the problem of inter-cell interference. However, in order to achieve the purpose of solving the inter-cell interference, the interference in the system must be measured effectively and accurately. In order to solve the problem of effectively and accurately measuring the interference produced (introduced) in the system, various different technologies have been widely discussed in standardization organizations such as the 3rd Generation Partnership Project (3GPP for short) and IEEE802.16e and etc . . . Typical solutions are to add power control, flexible frequency reuse, macro diversity, inter-cell interference randomization with interference elimination and etc. to user terminals. Although such technologies can be used to improve system performance and thus effectively improve peak data rate, average cell throughput and cell-edge user throughput, the technologies usually result in loss of average sector throughput or increased complexity of receivers.

The MU-MIMO is a key technology put forward in the Long Term Evolution (LTE for short) of the 3GPP technology to effectively solve problems of the peak data rate, the average cell throughput, and the cell-edge user throughput. During implementing the MU-MIMO, effectively pairing user terminals is an important factor which determines the performance of the MU-MIMO. In the prior art, usually pairing user terminals can be achieved according to parameters, such as path loss, reported by the user terminals and by performing calculation via inherent formulas. However, as network topology is becoming more and more complex, interference environment undergone by the user terminals is also increasingly complex, and especially in the wireless networks of the LTE of the 3GPP. Such interference increasingly impacts on the environment of pairing users, thereby seriously affecting the performance of the MU-MIMO. How to more effectively and more accurately pair user terminals and improve the properties of the MU-MIMO has been a topic that must be solved.

SUMMARY OF THE INVENTION

In view of the above, the main purpose of the present invention is to provide a method and a device for pairing user terminals in the Multiuser-Multiple input Multiple output, which can more effectively and more accurately pair users, thereby improving performances of the MU-MIMO.

In order to achieve the above purpose, the technical solution of the present invention is implemented as follows.

A method for pairing user terminals in the Multiuser-Multiple input Multiple output (MU-MIMO), comprises:
a base station setting pairing parameters;
the base station receiving report information of a user terminal, and setting parameter identifiers according to the set pairing parameters and the report information; and
after determining that the user terminal which reported the report information is a user terminal to be paired, the base station determining a user terminal paired with the user terminal to be paired according to the set parameter identifiers.

After determining the user terminal paired with the user terminal to be paired, a transmitting power of the user terminal paired is adjusted according to the set pairing parameters.

The pairing parameters comprise: a path loss comparison threshold, a transmitting power comparison threshold, and the number of user terminals that need to be paired.

The report information at least carries: path loss information, path information and transmitting power.

The set parameter identifiers comprise: a path loss identity identifier and a path identity identifier.

The step of determining the user terminals paired according to the set parameter identifiers is as follows: determining the user terminal paired with the user terminal to be paired sequentially from sets of user terminals having the same path loss identity identifier and the same path identity identifier with the user terminal to be paired, having the same path loss identity identifier and a different path identity identifier with the user terminal to be paired, having a different path loss identity identifier and the same path identity identifier with the user terminal to be paired, and having a different path loss identity identifier and a different path identity identifier with the user terminal to be paired.

The step of adjusting the transmitting power of the user terminal paired is embodied as: the base station adjusts the transmitting power of the user terminal, or the base station notifies a relay station to adjust the transmitting power of the user terminal.

A device for pairing user terminals in the Multiuser-Multiple input Multiple output (MU-MIMO), comprises: a parameter setting unit, a parameter identifier setting unit and a pairing performing unit, wherein
the parameter setting unit is configured to set pairing parameters;
the parameter identifier setting unit is configured to set parameter identifiers according to report information of a user terminal to be paired and the pairing parameters set by the parameter setting unit; and
the pairing performing unit is configured to determine a user terminal paired with the user terminal to be paired according to the parameter identifiers set by the parameter identifier setting unit.

The device further comprises a transmitting power adjusting unit which is configured to adjust a transmitting power of the user terminal paired with the user terminal to be paired, which is determined by the pairing performing unit, according to the pairing parameters set by the parameter setting unit.

The pairing parameters set by the parameter setting unit comprise: a path loss comparison threshold, a transmitting power comparison threshold, and the number of user terminals that need to be paired.

The parameter identifiers set by the parameter identifier setting unit comprise: a path loss identity identifier and a path identity identifier.

The operation of the pairing performing unit determining the user terminal paired is as follows: the pairing performing unit determines the user terminal paired with the user terminal to be paired sequentially from sets of user terminals having the same path loss identity identifier and the same path identity identifier with the user terminal to be paired, having the same path loss identity identifier and a different path identity identifier with the user terminal to be paired, having a different path loss identity identifier and the same path identity identifier with the user terminal to be paired, and having a different path loss identity identifier and a different path identity identifier with the user terminal to be paired.

The transmitting power adjusting unit is configured to directly adjust the transmitting power of the user terminal, or notify a relay station to adjust the transmitting power of the user terminal.

Under the precondition of considering the path loss condition of the user terminals, with the method and the device for pairing user terminals in the MU-MIMO provided by the present invention, the user terminals are paired in combination with the path condition of the user terminals, which relieves the influences of interference on the pairing result, thereby more effectively and more accurately pairing users and thus improves the performances of the MU-MIMO.

BRIEF DESCRIPTION OF THE ACCOMPANYING DRAWINGS

DETAILED DESCRIPTION OF THE EMBODIMENTS

A basic concept of the present invention is to pair user terminals in combination with path condition of the user terminals, under the precondition of considering path loss condition of the user terminals.

The implementation of technical solution will be further described in detail hereinafter in combination with the accompanying drawings.

Figure 1:
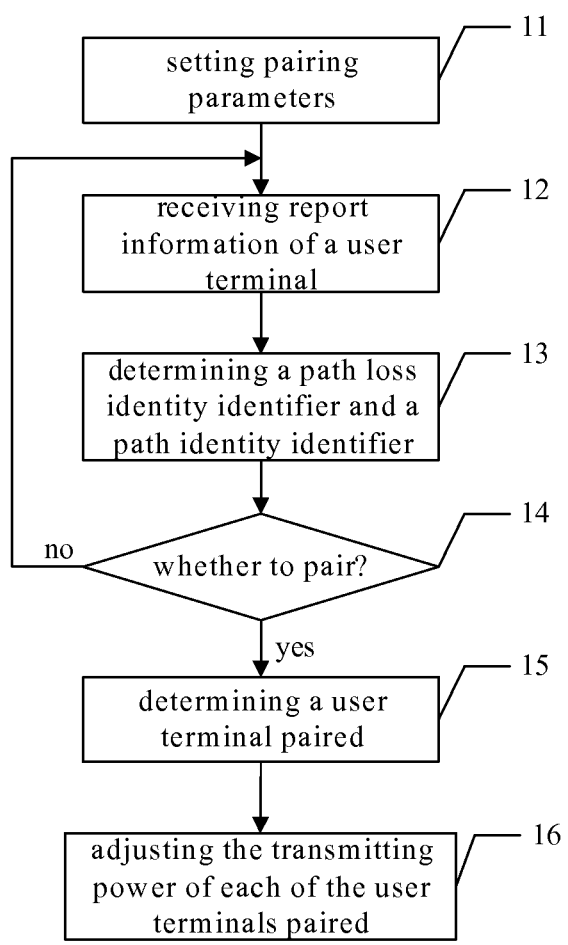
FIG. 1 is a flow chart of a method for pairing user terminals in the MU-MIMO according to an embodiment of the present invention.

FIG. 1 is a flow chart of a method for pairing user terminals in the MU-MIMO according to an embodiment of the present invention. As shown in FIG. 1, the method for pairing user terminals in the MU-MIMO of the present invention generally comprises the following steps.

Step 11, a base station sets pairing parameters.

Herein, the pairing parameters set by the base station at least comprise: a path loss comparison threshold, a transmitting power comparison threshold, and the number M of user terminals to be paired.

In the above, according to the size of the coverage area of the base station in a wireless communication network or actual requirements, the path loss comparison threshold can be set as one or more values, also can be set in a value range, so as to accurately distinguish the environments of user terminals; and the transmitting power comparison threshold also can be set in a dynamic value range according to requirements, and simultaneously, considering the coverage area of the base station, the transmitting power comparison threshold also can be flexibly expanded or shrunk.

Step 12, the base station receives report information of a user terminal.

Herein, the report information of the user terminal at least carries: path loss information (i.e., path loss value) of the user terminal, path information of the user terminal and a transmitting power of the user terminal. In the present invention, the path information of the user terminal mainly refers to whether there is a relay station in communication path of the user terminal.

Step 13, the base station determines a path loss identity identifier and a path identity identifier of the user terminal according to the report information.

Herein, the path loss identity identifier of the user terminal to be paired is determined according to the path loss value reported by the user terminal in the step 12 and the path loss comparison threshold set in the step 11.

For example, the path loss comparison threshold $TH_{PL}$, in the step 11 is set in a value range of $0.96 \leq TH_{PL} \leq 1.16$. The path loss identity identifiers which correspond to the path loss less than 0.96, the path loss within the range from 0.96 to 1.16, and the path loss more than 1.16 are respectively set as A, B and C. Then if the path loss value reported by the user terminal is 0.8, the path loss identity identifier is determined as A; if the path loss value reported by the user terminal is 1.1, the path loss identity identifier is determined as B; and if the path loss value reported by the user terminal is 1.17, the path loss identity identifier is determined as C.

In the present invention, the path identity identifier is mainly used to identify whether there is any relay station in the communication path of the user terminal.

Step 14, the base station determines whether to pair the user terminal according to the report information, wherein if yes, the user terminal is a user terminal to be paired, and step 15 is executed; otherwise it continues receiving the report information of the user terminal and returns to the step 12.

Herein, factors used for judging whether to pair the user terminal may be various. For example, it can be determined according to interference condition suffered by the user terminal, in this case, it is required to pre-set a path loss reference value in the step 11, and it is determined whether the user terminal should be paired by judging whether the path loss of the user terminal is higher than the path loss reference value; and for example, it can be determined according to communication quality of the user terminal, in this case, it is required to pre-set a communication quality reference value in the step 11, and it is determined whether the user terminal should be paired by judging whether the communication rate of the user terminal is lower than the communication quality reference value.

Step 15, the base station determines a user terminal paired with the user terminal to be paired according to the path loss identity identifier and the path identity identifier.

If there is a relay station in the communication path of the user terminal, the round-trip delay of a control signaling and data transmission will be greater than that of a direct path from the base station to the user terminal. Therefore, when in the paired user terminals some have the communication path with the relay station while some have the communication path without the relay station, this will easily affect the performances of the MU-MIMO. Thus, when pairing the user terminals, the present invention first considers the user terminals which have the same communication path.

Figure 2:
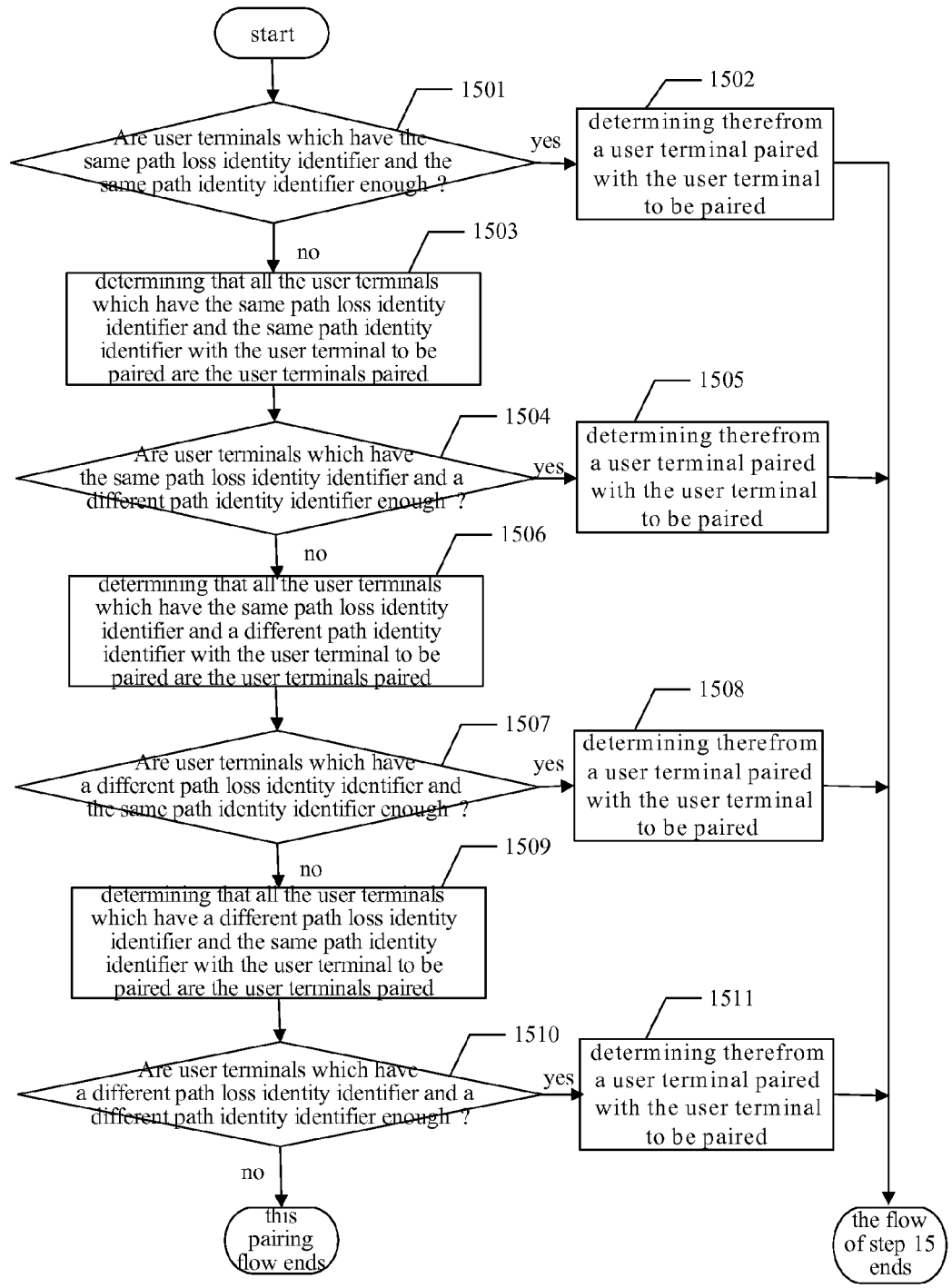
FIG. 2 is a specific flow chart of determining a paired user according to a path loss identify identifier and a path identify identifier according to an embodiment of the present invention.

FIG. 2 is a specific flow chart of determining a paired user according to a path loss identify identifier and a path identify identifier according to an embodiment of the present invention. As shown in FIG. 2, the step 15 of the present invention specifically comprises the following steps.

Step 1501, the base station judges whether the number M1 of the user terminals which have the same path loss identity identifier and the same path identity identifier with the user terminal to be paired is enough, wherein if it is enough, step 1502 is executed; otherwise, step 1503 is executed.

Herein, judging whether the number of the user terminals is enough refers to judging whether M1≥M is true.

Step 1502, the base station determines a user terminal paired with the user terminal to be paired from the user terminals which have the same path loss identity identifier and the same path identity identifier with the user terminal to be paired, and then the flow of step 15 ends.

Herein, when M1=M, it is determined that all the user terminals which have the same path loss identity identifier and the same path identity identifier with the user terminal to be paired are the user terminals paired with the user terminal to be paired; and when M1>M, the path loss of each of the M1 user terminals is compared with that of the user terminal to be paired, and M user terminals whose path loss is closer to the user terminal to be paired are selected therefrom to pair.

There are various flexible methods for judging the degree to which the user terminals are close to the user terminal to be paired in regard of the path loss. For example, it can be judged by calculating the ratio of the path loss of the user terminals to the path loss of the user terminal to be paired, wherein the closer the ratio is to 1, the closer the path losses of the both are with each other; and it is may also be judged by calculating the absolute value of the difference between the path loss of the user terminals and the path loss of the user terminal to be paired, wherein the smaller the absolute value is, the closer the path losses of the both are with each other.

Step 1503, the base station determines that all the user terminals which have the same path loss identity identifier and the same path identity identifier with the user terminal to be paired are user terminals paired with the user terminal to be paired.

Step 1504, the base station determines whether the number M2 of the user terminals which have the same path loss identity identifier and a different path identity identifier with the user terminal to be paired is enough, wherein if it is enough, step 1505 is executed; otherwise, step 1506 is executed.

Herein, judging whether the number of the user terminals is enough refers to judging whether M2≥M−M1 is true.

Step 1505, the base station continues determining a user terminal paired with the user terminal to be paired from the user terminals which have the same path loss identity identifier and a different path identity identifier with the user terminal to be paired, and then the flow of the step 15 ends.

Herein, when M2=M−M1, it is determined that all the user terminals which have the same path loss identity identifier and a different path identity identifier with the user terminal to be paired are user terminals paired with the user terminal to be paired; and when M2>M−M1, the path loss of each of the M2 user terminals is compared with that of the user terminal to be paired, and (M−M1) user terminals whose path loss is closer to the user terminal to be paired are selected therefrom to pair.

The methods for judging the degree to which the user terminals are close to the user terminal to be paired in regard of the path loss are as the same as that in the step 1502.

Step 1506, the base station determines that all the user terminals which have the same path loss identity identifier and a different path identity identifier with the user terminal to be paired are the user terminals paired with the user terminal to be paired.

Step 1507, the base station judges whether the number M3 of the user terminals which have a different path loss identity identifier and the same path identity identifier with the user terminal to be paired is enough, wherein if it is enough, step 1508 is executed; otherwise, step 1509 is executed.

Herein, judging whether the number of the user terminals is enough refers to judging whether M3≥M−M1−M2 is true.

Step 1508, the base station continues determining a user terminal paired with the user terminal to be paired from the user terminals which have a different path loss identity identifier and the same path identity identifier with the user terminal to be paired, and then the flow of the step 15 ends.

Herein, when M3=M−M1−M2, it is determined that all the user terminals which have a different path loss identity identifier and the same path identity identifier with the user terminal to be paired are user terminals paired with the user terminal to be paired; and when M3>M−M1−M2, the path loss of each of the M3 user terminals is compared with that of the user terminal to be paired, and (M−M1−M2) user terminals whose path loss is closer to the user terminal to be paired are selected therefrom to pair.

The methods for judging the degree to which the user terminals are close to the user terminal to be paired in regard of the path loss are as the same as that in the step 1502.

Step 1509, the base station determines that all the user terminals which have a different path loss identity identifier and the same path identity identifier with the user terminal to be paired are user terminals paired with the user terminal to be paired.

Step 1510, the base station judges whether the number M4 of the user terminals which have a different path loss identity identifier and a different path identity identifier with the user terminal to be paired is enough, wherein if it is enough, step 1511 is executed; otherwise, this pairing flow ends.

Herein, judging whether the number of the user terminals is enough refers to judging whether M4≥M−M1M2−M3 is true.

After this pairing flow ends, the report information of the user terminal is continued to receive, and it returns to the step 12.

Step 1511, the base station continues determining a user terminal paired with the user terminal to be paired from the user terminals which have a different path loss identity identifier and a different path identity identifier with the user terminal to be paired, and then the flow of the step 15 ends.

Herein, when M4=M−M1−M2−M3, it is determined that all the user terminals which have a different path loss identity identifier and a different path identity identifier with the user terminal to be paired are user terminals paired with the user terminal to be paired; and when M4>M−M1−M2−M3, the path loss of each of the M4 user terminals is compared with that of the user terminal to be paired, and (M−M1−M2−M3) user terminals whose path loss is closer to the user terminal to be paired are selected therefrom to pair.

The methods for judging the degree to which the user terminals are close to the user terminal to be paired in regard of the path loss are as the same as that in the step 1502.

In practical application, the user terminals may be divided by the base station into multiple path loss sets according to multiple path loss comparison thresholds, then if no enough paired terminals are found in a path loss set to which the user terminal to be paired belongs, the paired terminals should be sequentially searched according to the degree to which the other path loss sets are close to the path loss of the user terminal to be paired.

Step 16, the transmitting power of each of the user terminals paired is adjusted.

Herein, the path condition of each of the user terminals successfully paired is judged according to the path identity identifier, wherein if a user terminal is served via a base station, the transmitting power of the user terminal is adjusted by the base station according to the transmitting power comparison threshold; and if a user terminal is served via a relay station, the base station notifies the relay station to adjust the transmitting power of the user terminal according to the transmitting power comparison threshold.

The meaning of the path identity identifier will be described by taking pairing two user terminals as an example. Pairing two user terminals has four pairing cases: the two user terminals are served via a base station directly, via two different relay stations respectively, via a base station and a relay station respectively, and via the same relay station. According to the pairing case of the user terminals, 2 bits are used to represent the path identity identifier, and the meaning of the path identity identifier is set as shown in table 1. The table 1 shows the relationship between the path identity identifiers and the pairing cases.

TABLE 1

| Path identity identifier bit | List of the pairing cases of the user terminals |
|---|---|
| 00 | Being served via a base station directly |
| 01 | Being served via two different relay stations respectively |
| 10 | Being served via a base station and a relay station respectively |
| 11 | Being served via the same relay station |

In order to prevent inter-cell interference and near-far effect, when the base station or the relay station adjusts the transmitting powers of the user terminals as paired, too much difference in transmitting power can not be made between the user terminals as paired. Thus the base station or the relay station need be restricted in adjusting the transmitting powers of the user terminals according to the transmitting power comparison threshold set in the step 11.

The transmitting power comparison threshold, for example, is defined as follows.

It is supposed that there are N user terminals in an identity interference set, the adjusted transmitting power of the user terminal to be paired is $P_{Sut}$, $P_{Gut}(i)$, $i=0 \sim N-1$ is the transmitting power of the user terminals in a path loss identity user terminal set, then the transmitting power comparison threshold is defined as follows:

$$TH_{PT} = P_{Sut}/P_{Gut}(i)$$

The selection of the transmitting power comparison threshold should be based on the effective reduction of the interference and the prevention of the generation of the near-far effect in the cell. The transmitting power comparison threshold can be set in a dynamic range, for example, $0.86 \leq TH_{PT} \leq 1.26$. The adjusted transmitting power $P_{Sut}$ of the user terminal to be paired can be determined according to the definition of the transmitting power comparison threshold.

Figure 3:
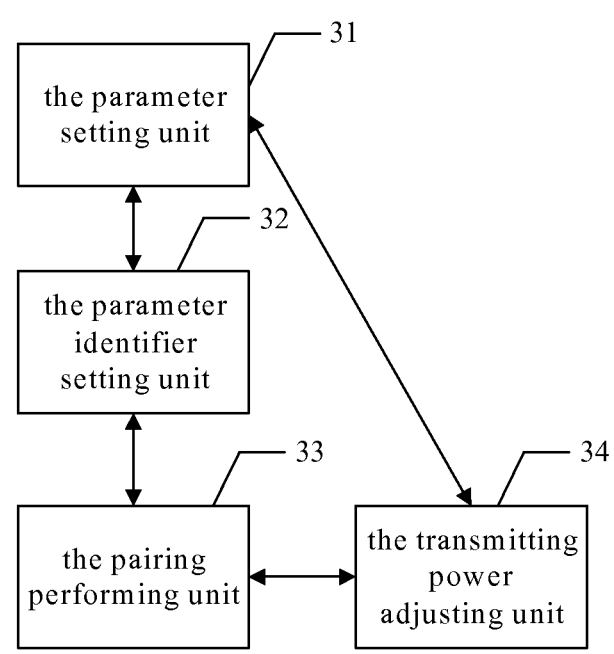
FIG. 3 is a structural diagram of a device for pairing user terminals in the MU-MIMO according to an embodiment of the present invention.

FIG. 3 is a structural diagram of a device for pairing user terminals in the MU-MIMO according to an embodiment of the present invention. As shown in FIG. 3, the device for pairing user terminals in the MU-MIMO of the present invention comprises: a parameter setting unit 31, a parameter identifier setting unit 32, a pairing performing unit 33 and a transmitting power adjusting unit 34.

In the device, the parameter setting unit 31 is configured to set pairing parameters.

Herein, the pairing parameters generally include a path loss comparison threshold, a transmitting power comparison threshold, and the number M of user terminals to be paired, wherein according to the size of the coverage area of the base station in a wireless communication network or actual requirements, the path loss comparison threshold can be set as one or more values, also can be set in a value range, so as to accurately distinguish the environments of user terminals; and the transmitting power comparison threshold also can be set in a dynamic value range according to requirements, and simultaneously, considering the coverage area of the base station, the transmitting power comparison threshold also can be flexibly expanded or shrunk.

The parameter identifier setting unit 32 is configured to set a path loss identity identifier and a path identity identifier according to report information of a user terminal to be paired and the pairing parameters set by the parameter setting unit 31.

The report information of the user terminal at least carries path loss information (i.e., a path loss value) of the user terminal, path information of the user terminal and transmitting power of the user terminal. In the present invention, the path information of the user terminal mainly refers to whether there is any relay station in communication path of the user terminal.

Factors used for determining the user terminal to be paired, i.e., judging whether to pair the user terminal, may be various. For example, it is determined according to interference condition suffered by the user terminal, in this case, it is required to pre-set a path loss reference value in the step 11, and it is determined whether the user terminal is paired by judging whether the path loss of the user terminal is higher than the path loss reference value; and for example, it can be determined according to communication quality of the user terminal, in this case, it is required to pre-set a communication quality reference value in the step 11, and it is determined whether the user terminal is paired by judging whether the communication rate of the user terminal is less than the communication quality reference value.

The pairing performing unit 33 is configured to determine a user terminal paired with the user terminal to be paired according to the parameter identifiers set by the parameter identifier setting unit 32.

If there is a relay station in the communication path of the user terminal, the round-trip delay of a control signaling and data transmission will be greater than that of a direct path from the base station to the user terminal. Therefore, in the paired user terminals, some while some have the communication path without the relay station, this will easily affect the performances of the MU-MIMO. Thus, when pairing the user terminals, the present invention first considers the user terminals which have the same communication path. The specific implementation method is as described in the step 15, which is omitted herein.

The transmitting power adjusting unit 34 is configured to adjust a transmitting power of the user terminal paired with the user terminal to be paired, which is determined by the pairing performing unit 33, according to the pairing parameters set by the parameter setting unit 31.

Herein, the path condition of each of the user terminals successfully paired are judged according to the path identity identifier, wherein if a user terminal is served via a base station, the transmitting power of the user terminal is adjusted by the base station according to the transmitting power comparison threshold; and if a user terminal is served via a relay station, the base station notifies the relay station to adjust the transmitting power of the user terminal according to the transmitting power comparison threshold. The specific adjusting method is as described in the step 16, which is omitted herein.

The above description is just preferable embodiments of the present invention, which is not intended to restrict the scope of the protection of the present invention.

The invention claimed is:

1. A method for pairing user terminals in the Multiuser-Multiple input Multiple output (MU-MIMO), comprising:
   a base station setting pairing parameters;
   the base station receiving report information of a user terminal, and setting parameter identifiers according to the set pairing parameters and the report information; and
   after determining that the user terminal which reported the report information is a user terminal to be paired, the base station determining a user terminal paired with the user terminal to be paired according to the set parameter identifiers;
   wherein the set parameter identifiers comprise: a path loss identity identifier and a path identity identifier, the step of determining the user terminals paired according to the set parameter identifiers is as follows: determining the user terminal paired with the user terminal to be paired sequentially from sets of user terminals having the same path loss identity identifier and the same path identity identifier with the user terminal to be paired, having the same path loss identity identifier and a different path identity identifier with the user terminal to be paired, having a different path loss identity identifier and the same path identity identifier with the user terminal to be paired, and having a different path loss identity identifier and a different path identity identifier with the user terminal to be paired.

2. The method for pairing user terminals according to claim 1, wherein after determining the user terminal paired with the user terminal to be paired, a transmitting power of the user terminal paired is adjusted according to the set pairing parameters.

3. The method for pairing user terminals according to claim 1, wherein the pairing parameters comprise: a path loss comparison threshold, a transmitting power comparison threshold, and the number of user terminals that need to be paired.

4. The method for pairing user terminals according to claim 1, wherein the report information at least carries: path loss information, path information and transmitting power.

5. The method for pairing user terminals according to claim 2, wherein the step of adjusting the transmitting power of the user terminal paired is embodied as: the base station adjusts the transmitting power of the user terminal, or the base station notifies a relay station to adjust the transmitting power of the user terminal.

6. A device for pairing user terminals in the Multiuser-Multiple input Multiple output (MU-MIMO), comprising: a parameter setting unit, a parameter identifier setting unit and a pairing performing unit, wherein
   the parameter setting unit is configured to set pairing parameters;
   the parameter identifier setting unit is configured to set parameter identifiers according to report information of a user terminal to be paired and the pairing parameters set by the parameter setting unit; and
   the pairing performing unit is configured to determine a user terminal paired with the user terminal to be paired according to the parameter identifiers set by the parameter identifier setting unit;
   wherein the parameter identifiers set by the parameter identifier setting unit comprise: a path loss identity identifier and a path identity identifier, the operation of the pairing performing unit determining the user terminal paired is as follows:
   the pairing performing unit determines the user terminal paired with the user terminal to be paired seguentially from sets of user terminals having the same path loss identity identifier and the same path identity identifier with the user terminal to be paired, having the same Path loss identity identifier and a different path identity identifier with the user terminal to be paired, having a different oath loss identity identifier and the same path identity identifier with the user terminal to be paired, and having a different path loss identity identifier and a different path identity identifier with the user terminal to be paired.

7. The device for pairing user terminals according to claim 6, wherein the device further comprises a transmitting power adjusting unit which is configured to adjust a transmitting power of the user terminal paired with the user terminal to be paired, which is determined by the pairing performing unit, according to the pairing parameters set by the parameter setting unit.

8. The device for pairing user terminals according to claim 6, wherein the pairing parameters set by the parameter setting unit comprise: a path loss comparison threshold, a transmitting power comparison threshold, and the number of user terminals that need to be paired.

9. The device for pairing user terminals according to claim 7, wherein the transmitting power adjusting unit is configured to directly adjust the transmitting power of the user terminal, or notify a relay station to adjust the transmitting power of the user terminal.

* * * * *